United States Patent [19]
Yane et al.

[11] Patent Number: 5,930,458
[45] Date of Patent: Jul. 27, 1999

[54] HIGH EFFICIENCY ULTRA-PURE FLUID HEATER

[75] Inventors: Daryl J. Yane, Kent; Howard J. Base, Macedonia; Joseph E. James, Streetsboro, all of Ohio

[73] Assignee: Lufran Incorporated, Streetsboro, Ohio

[21] Appl. No.: 09/006,112

[22] Filed: Jan. 13, 1998

Related U.S. Application Data

[60] Provisional application No. 60/035,479, Jan. 13, 1997.

[51] Int. Cl.⁶ .................................................. F24H 1/10
[52] U.S. Cl. ............................................ 392/482; 392/492
[58] Field of Search ................................. 392/482, 492, 392/320, 461, 468, 472, 478, 486, 487

[56] References Cited

U.S. PATENT DOCUMENTS

| | | |
|---|---|---|
| 4,762,980 | 8/1988 | Insley . |
| 4,835,365 | 5/1989 | Etheridge . |
| 5,054,107 | 10/1991 | Batchelder . |
| 5,054,108 | 10/1991 | Gustin et al. . |
| 5,396,574 | 3/1995 | Base et al. . |

*Primary Examiner*—Teresa Walberg
*Assistant Examiner*—Vinod D. Patel
*Attorney, Agent, or Firm*—Fay, Sharpe, Beall, Fagan, Minnich & McKee

[57] ABSTRACT

An apparatus for heating a fluid such as ultra-pure de-ionized (UPDI) water is disclosed. The fluid heater includes an intermediate body portion, a bottom end cap assembly secured to one end of the intermediate body portion, and a top end cap assembly secured to the other end of the intermediate body portion. The intermediate body portion includes a number of concentric quartz tubes wherein a first quartz tube is spaced radially inwardly of a second quartz tube to define an inner fluid pathway for heating UPDI water while flowing through the inner fluid pathway. A third quartz tube is spaced radially outwardly of the second quartz tube and radially inwardly of a fourth quartz tube to define an outer annular fluid pathway for further heating the UPDI water received from the inner fluid pathway. A resistive heating element is interposed between the second and third quartz tubes for heating the UPDI water by means of conduction, convection and heat radiation with a heating efficiency approaching 100%.

15 Claims, 14 Drawing Sheets

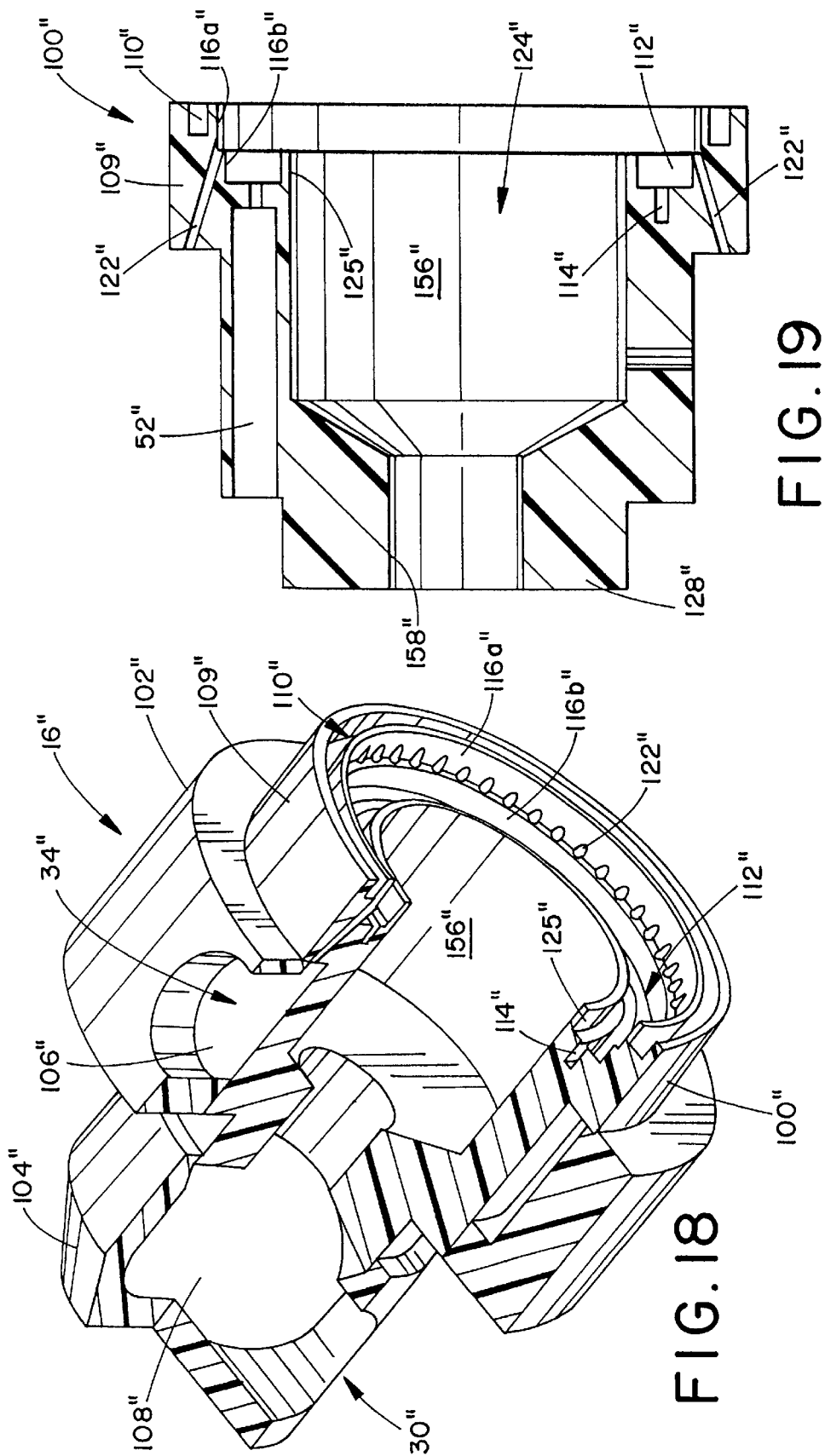

HIGH EFFICIENCY ULTRA-PURE FLUID HEATER

CROSS REFERENCE TO RELATED APPLICATIONS

This application claims the benefit of U.S. Provisional Patent Application No. 60/035,479, filed Jan. 13, 1997 and incorporated herein by reference.

BACKGROUND OF THE INVENTION

The present invention relates generally to fluid heaters, and more particularly to an apparatus for heating a fluid such as ultra-pure de-ionized (UPDI) water.

Heated UPDI water is used in the manufacture of semiconductor devices. However, UPDI water is a corrosive liquid. Thus, equipment used for heating UPDI water must be capable of withstanding the corrosive effects of the UPDI water that flows therethrough.

In addition, it is critical that the equipment used to manufacture semiconductor devices be capable of performing specific tasks while not introducing contaminates into the manufacturing process. Until very recently, cost was not a primary concern for semiconductor manufacturing equipment, performing the task effectively was. With the semiconductor industry maturing, and competition increasing, performance and economy have both become important concerns.

In the area of fluid heating systems for use in the semiconductor manufacturing industry, the material most commonly used for resisting the corrosive effects of UPDI water has been Teflon, due to its relative ease of manufacture. Teflon adds virtually no contaminates to the process, however, it does allow for permeation of particulates, and biological growth, commonly referred to as total organic carbons (TOC's). Due to this problem, other materials have been studied, more specifically quartz.

Quartz has been used extensively for constructing process equipment in the semiconductor industry from the very beginning. Quartz is chemically resistant to most of the process fluids used, and also adds very little contamination. Although quartz has been used for tanks, furnace tubes, labware, and plumbing components, quartz has only recently been applied to UPDI water heating systems. Conventional quartz UPDI water heating systems, although very clean, and responsive to temperature/flow demand changes, are generally unreliable, inefficient, and very expensive to manufacture as well as to operate.

In particular, conventional quartz UPDI water heaters utilize standard quartz halogen radiant bulbs as a heat source. This approach permits fast response due to the low mass of the heating element, but has proven to be both unreliable, as well as inefficient. Known quartz UPDI water heaters typically achieve efficiencies in the mid 80% range.

Another problem with known quartz UPDI water heaters is that they tend to develop fluid leaks, and must be continually serviced. That is, forming reliable fluid-tight seals between the quartz components and the plastic components of the known quartz UPDI water heaters has been a problem for manufactures.

Accordingly, it has been considered desirable to develop a new and improved high-efficiency ultra-pure de-ionized fluid heater which meets the above-stated needs and overcomes the foregoing difficulties and others while providing better and more advantageous results.

SUMMARY OF THE INVENTION

In accordance with one aspect of the present invention, a new and improved fluid heater is provided. The fluid heater includes an intermediate body portion having a first fluid pathway and a second fluid pathway. The second fluid pathway surrounds the first fluid pathway. A bottom end cap assembly is secured to the intermediate body portion and communicates with the first and the second fluid pathways. The bottom end cap assembly includes a plurality of cross bores for permitting an operating fluid to transfer between the first and the second fluid pathways. A top end cap assembly is secured to the intermediate body portion and has an inlet port and an outlet port each communicating with one of the first and the second fluid pathways. The bottom end cap assembly and the top end cap assembly are formed from a first material, and the first fluid pathway and the second fluid pathway are formed from a second material different from the first material.

UPDI water enters the fluid heater via a standard plumbing connection. The UPDI water is distributed by a circular array of bores in the second end cap into the first fluid pathway formed by two concentric quartz tubes. An electric heating element is formed around the outer of the two quartz tubes. The UPDI water is heated while passing through the first fluid pathway. The heated UPDI water then passes through the cross bores into the fluid manifold. The UPDI water is directed through a second array of bores in the first end cap which distributes the UPDI water to the second fluid pathway created by two additional quartz tubes radially surrounding the electric heating element.

The distribution of the UPDI water as described maintains a laminar fluid flow so as not to accelerate the erosion of the quartz tubes, thereby keeping particle generation to a minimum. In addition, the fluid flow is equalized over the entire heated surface area of the quartz tubes to maximize heat transfer by yielding the highest log mean temperature difference (LMTD) possible.

The fluid heater of the present invention utilizes a ribbon-type resistive heating element that does not require a halogen environment for operation, thereby reducing the costs of production. Utilizing a ribbon-type resistive heating element also yields heat transfer more effectively by means of conduction directly through the quartz tubes. The ribbon heating element operates at temperatures that produce radiant heat at the specific wave-length for maximum absorption by the UPDI water.

In addition, the use of a ribbon-type resistive heating element yields the lowest possible mass of the heating element while providing the most efficient heat source. Reducing the mass of the heating element improves the response of the heating element to changes in flow rates. That is, the fluid heater of the present invention maintains the operating fluid discharged therefrom at a substantially constant temperature level regardless of an increase or a decrease in the flow rate of operating fluid through the fluid heater.

The heating element is wound directly against each successive turn about a quartz tube which supports the heating element, thereby reducing the total mass, volume, and cost of the fluid heater. A fibrous quartz sleeve surrounds the heating element to prevent electrical "shorting" between the turns thereof. Power connections are accomplished by attaching the ends of the resistive heating element to opposing copper rings. The copper rings provide non-heated electrical connections, as well as support for the end seals formed between the quartz tubes and the top and bottom plastic end cap assemblies.

The fluid heater incorporates fluid-tight end seals or gaskets which are subjected to a sealing force in an axial direction. Thus, differential expansion between the plastic end cap assemblies and the quartz tubes (i.e. the plastic end cap assemblies and the quartz tubes have different coefficients of thermal expansion) is compensated for so as to eliminate fluid leaks.

Thus, the end cap assemblies are designed to minimize the effects of different rates of thermal expansion. They are secured to the quartz tubes by compressive forces created by bolting a flange to an outer shell. The outer shell surrounds the quartz tubes and is made of stainless steel, although any conductive material can be used for this purpose. The outer shell provides mechanical strength to impart an axial load on the quartz tubes thereby forming a seal with the plastic end manifolds. The outer shell also provides for containment of an insulating material to maximize efficiency, for an electrical ground in the event of a fracture of the quartz tubes, and for protection from potential external impact.

One advantage of the present invention is the provision of a new and improved fluid heater which has an efficiency approaching 100% when heating UPDI water. To achieve this level of heating efficiency, thermal energy is transferred to the UPDI water by conduction, convection and heat radiation.

Another advantage of the present invention is the provision of a fluid heater which utilizes radial arrays of bores to evenly distribute fluid flow between pairs of concentric tubes so as to provide maximum fluid flow while maintaining a laminar flow.

Still another advantage of the present invention is the provision of a fluid heater which permits fluid to surround both sides of a heating element thus maximizing heating efficiency while minimizing the mass of the heating element.

Yet another advantage of the present invention is the provision of a fluid heater in which axial end seals are formed between concentric tubes made of a first material and adjacent end cap assemblies made of a second material thus minimizing the potential for fluid leaks by compensating for differential thermal expansion.

A further advantage of the present invention is the provision of a fluid heater which utilizes a fibrous quartz braid surrounding a resistive heating element to allow for "tight" winding thereby minimizing material used and reducing total mass of the fluid heater.

A still further advantage of the present invention is the provision of a fluid heater which includes an outer shell which provides a grounding means, as well as mechanical strength and impact resistance.

Yet further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangement of steps. The drawings are only for purposes of illustrating preferred embodiments of the present invention and are not to be construed as limiting the invention.

FIG. 18 is perspective view, partially cut away, of a third embodiment of a top end cap assembly for the fluid heater of FIG. 1;

FIG. 19 is a longitudinal sectional view through a top intermediate end cap of the top end cap assembly of FIG. 18;

DETAILED DESCRIPTION OF THE PREFERRED EMBODIMENTS

Figure 1:
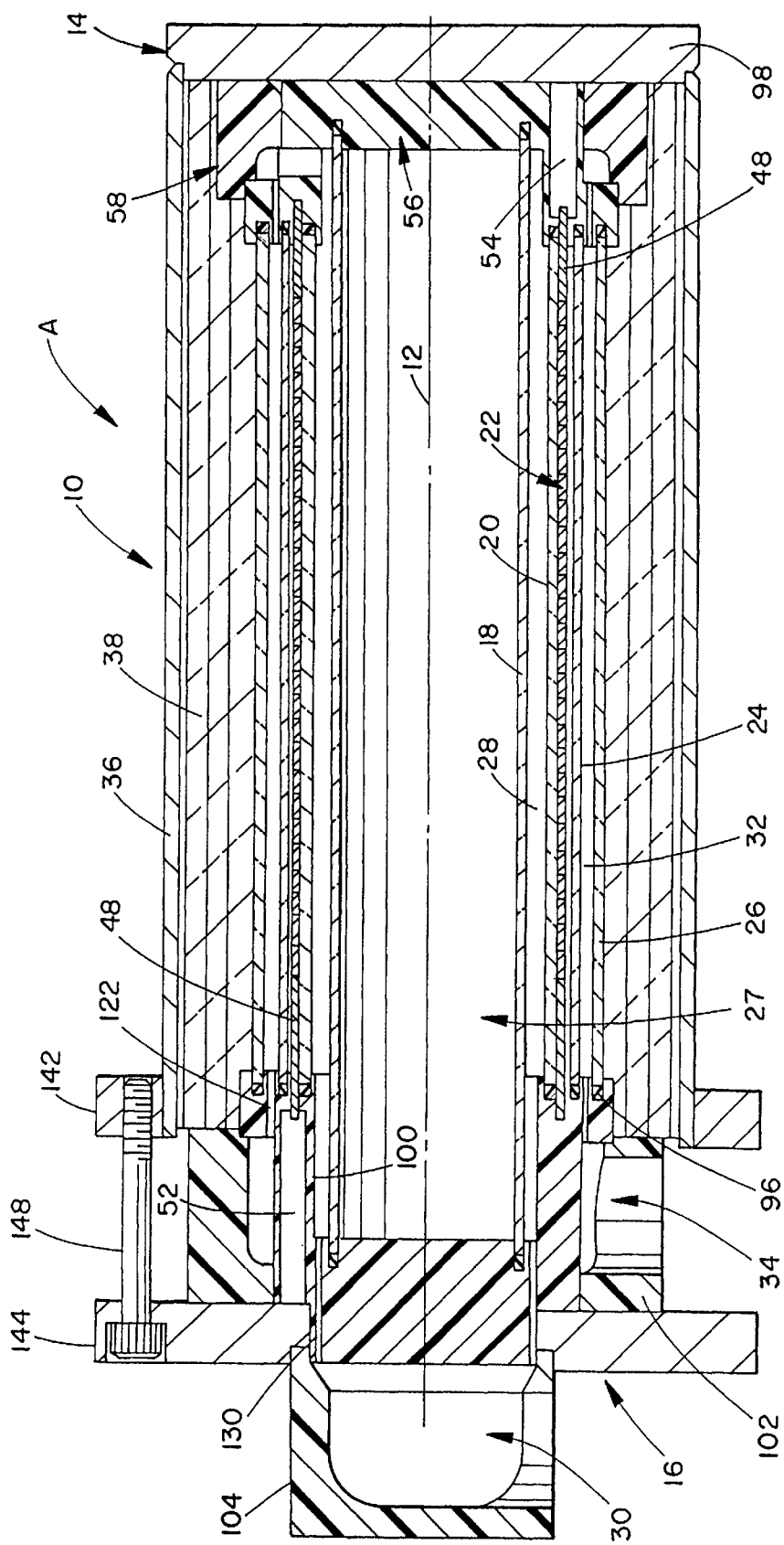
FIG. 1 is a cross-sectional view through an assembled fluid heater which incorporates the features of the present invention therein.

Referring now to the drawings which illustrate preferred embodiments of the present invention, and are not to be construed as limiting the same, FIG. 1 illustrates a fluid heater A for use in heating UPDI water. It should, however, be appreciated by those of average skill in the art that the invention could also be used in various other environments where fluid heaters are employed.

The fluid heater A includes a intermediate body portion 10 having a central longitudinal axis 12 extending therethrough. A bottom end cap assembly 14 is secured to a first end of the intermediate body portion 10 and a top end cap assembly 16 is secured to a second end of the intermediate body portion 10. As described in greater detail below, the intermediate body portion 10, bottom end cap assembly 14 and top end cap assembly 16 cooperate to heat an operating fluid, such as ultra-pure de-ionized (UPDI) water, flowing therethrough with a heating efficiency approaching 100%.

The intermediate body portion 10 includes an inner tube 18, an inner heating element tube 20, a heating element assembly 22, an outer heating element tube 24 and an outer tube 26. The tubes 18, 20, 24 and 26 are concentric. A central cavity 27 is defined within the inner tube 18. In the embodiment being described, the central cavity 27 is void. The inner tube 18 is spaced radially inward from the inner heating element tube 20 to define a first or inner annular fluid pathway 28 for carrying fluid received from an inlet port 30 associated with the top end cap assembly 16. The inner heating element tube 20 is spaced radially inward from the outer heating element tube 24 to receive the heating element assembly 22 therebetween. The outer heating element tube 24 is spaced radially inward from the outer tube 26 to define a second or outer annular fluid pathway 32 for carrying fluid received from the inner fluid pathway 28 to an outlet port 34 associated with the top end cap assembly 16.

The intermediate body portion 10 also includes an outer shell 36 surrounding the outer tube 26. Insulation 38, such as high-temperature closed cell foam insulation, is interposed between the outer tube 26 and the outer shell 36. In the embodiment being described, the inner tube 18, inner heating element tube 20, outer heating element tube 24 and outer tube 26 are each formed from quartz material, and the outer shell 36 is formed from stainless steel.

Figure 2:
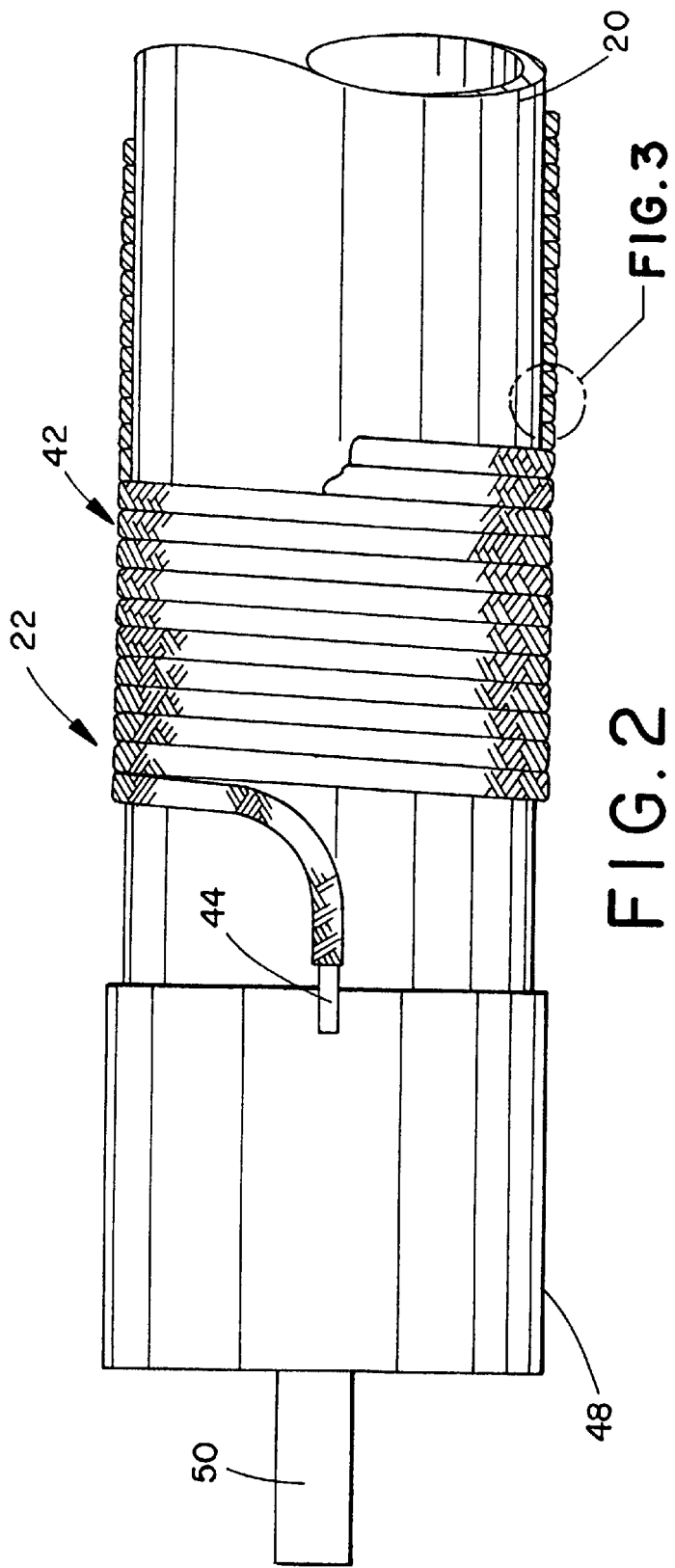
FIG. 2 is a partial cross-sectional view through a heating element assembly of the fluid heater of FIG. 1.
Figure 3:
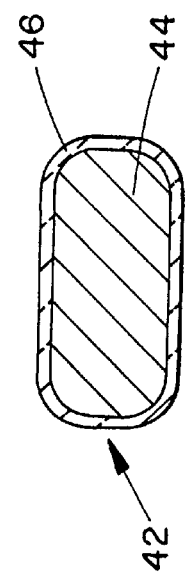
FIG. 3 is an enlarged cross-sectional view of a resistance wire surrounded by a braided insulation sleeve of the heating element assembly of FIG. 2.

With reference now to FIGS. 2 and 3, the heating element assembly 22 includes a resistive heating element 42 spirally wound around the inner heating element tube 20. The resistive heating element 42 includes a "ribbon" style resistive wire 44 surrounded by a high-temperature electrical insulation sleeve 46. In the embodiment being described, the insulation sleeve 46 is formed from a fibrous quartz braid which permits the resistive wire 44 to be tightly wound around the inner heating element tube 20 thereby minimizing the amount of material used and reducing the total mass of the fluid heater A.

The resistive wire 44 may be formed from Nichrome which provides good temperature stability. A Nichrome resistive wire 44 suitable for use in the present invention is commercially available from Kanthal Corporation of Bethel, Conn. A fluid heater A having a Nichrome heating element 42 that is rated at about 12 kilowatts has a total operating fluid holding capacity of approximately ten (10) fluid ounces. That is, the inner fluid pathway 28 holds about 4.5 fluid ounces and the outer fluid pathway 32 holds about 5.5 fluid ounces. The nominal operating temperature of the Nichrome heating element 42 is approximately 1400°–1450° F. (760°–788° C.) with a maximum operating temperature rating of approximately 1700° F. (927° C.).

The velocity of the fluid flow through the inner and outer fluid pathways 28, 32 may vary depending upon the desired temperature increase of the operating fluid. For instance, at flow rate of about 0.65 gallons per minute (GPM), the operating fluid has a velocity of approximately 0.5 feet/second and takes approximately 7.2 seconds to flow through the fluid heater. An operating fluid flowing through the fluid heater at 0.65 GPM experiences a temperature increase from a nominal input temperature of 68° F. (20° C.) to approximately 194° F. (90° C.) output temperature.

If the flow rate of the operating fluid is increased to 2.0 GPM, the operating fluid has a velocity of approximately 1.5 feet/second and takes approximately 2.3 seconds to flow through the fluid heater. An operating fluid flowing through the fluid heater at 2.0 GPM experiences a 45° F. temperature increase from a nominal input temperature of 68° F. (20° C.) to approximately 113° F. (45° C.) output temperature.

It is desirable to maintain the fluid velocity through the fluid heater A at a relatively low level, e.g. under 6.0 ft/s, in order to prevent or reduce erosion of the quartz-lined inner and outer fluid pathways 28, 32. It should be appreciated that the fluid velocities for the fluid heater A are relatively low when compared to known fluid heater systems made from metal. However, the fluid velocities for the fluid heater A are high when compared to known Teflon and Quartz fluid heaters. The velocity of fluid flow through the fluid heater A not only insures that the heat generated by the heating element 42 is carried away, but also assists in preventing stagnant fluid flow in areas within the inner and outer fluid pathways 28, 32 where sediment deposition could occur.

The use of a ribbon-type resistive heating element 42 yields the lowest possible mass of the heating element while providing the most efficient heat source. It should be appreciated that reducing the mass of the heating element improves the response (i.e., reduces the response time) of the heating element to load changes. Fluid heaters conventionally utilize a control system to maintain desired operating fluid temperatures. In addition, fluid heaters typically have a hysteresis (e.g. a normal fluctuation of temperature between a high point and a low point) associated therewith. Depending upon the control system used, the hysteresis may be as high as ±5–10° C., or as low as ±0.5° C.

A temperature control system (not shown) associated with the fluid heater A controls the fluid heating process. In a dynamic system such as heating a flowing fluid, controlling the temperature of the flowing fluid is difficult due to changes in load (e.g. the volume of fluid flowing through the fluid heater). For example, if the fluid flow rate through a 12 kilowatt quartz fluid heater were to slow from 0.65 GPM, which yields a 70° C. temperature rise, to 0.5 GPM, a temperature increase of over 90° C. would result. In that case the water could turn to steam and cause serious problems within the system that the fluid heater is being used in.

The smaller the mass of the heating element, the less amount of energy can be stored by the heating element. Thus, when the temperature control system senses an increase in the temperature of the operating fluid, the temperature control system removes power from the heating element and the small amount of energy stored in the heating element has little effect upon the process. On the other hand, if the fluid flow rate increases, less time is required to bring the "low-mass" heating element up to operating temperature before the heating element can impart heat to the operating fluid.

Conductive rings 48 (FIG. 2), preferably formed from copper, are secured over the respective exterior end surfaces of the inner heating element tube 20. The free ends of the resistive wire 44 are brazed, or otherwise joined to the respective rings 48 so as to form an electrical connection thereto. A first electrical lead 50 extends from one conductive ring 48 at least partially through a first power access port 52 (FIG. 1) associated with the top end cap assembly 16 to provide a first electrical connection to the resistive wire 44. Likewise, a second electrical lead (not shown) extends from the other conductive ring 48 at least partially through a second power access port 54 (FIG. 1) associated with the bottom end cap assembly 14 to provide a second electrical connection to the resistive wire 44.

The surface area of the conductive rings 48 are great enough to dissipate the heat generated by the resistive heating element 42 at each end of the inner heating element tube 20 thereby preventing the bottom and top end cap assemblies 14, 16 from being subjected to high temperatures generated by the heating element 42. In particular, the conductive rings 48 prevent the end cap assemblies from reaching temperatures approaching their melting point. In a preferred embodiment, the end cap assemblies 14, 16 are formed from a plastic material such as polyvinylidene fluoride (PVDF). PVDF is commercially available under the trade name KYNAR from E/F Atochem North America Inc., or under the trade name SYGEF from George Fisher Corporation.

Figure 4:
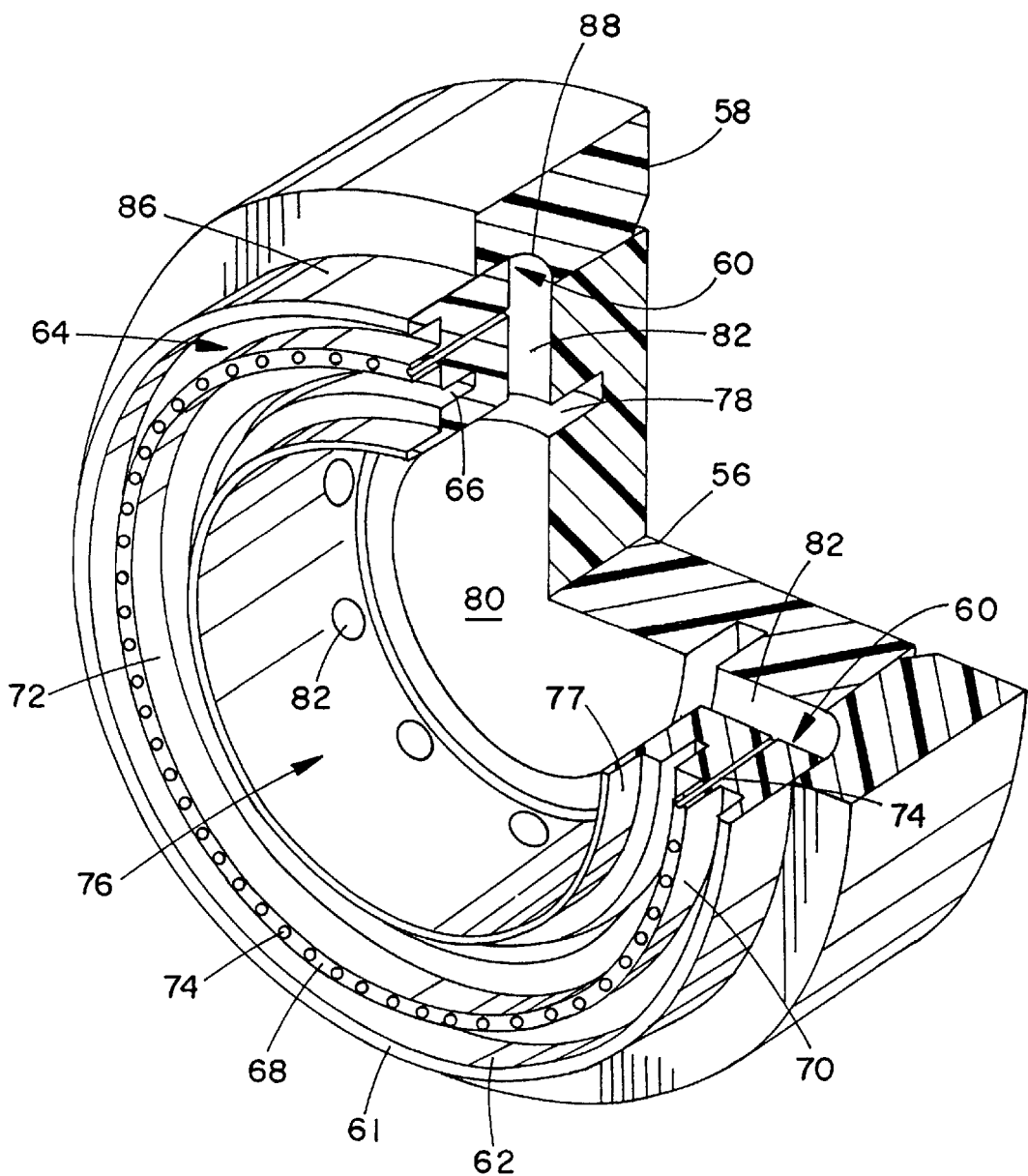
FIG. 4 is a perspective view, partially cut away, of a bottom end cap assembly of the fluid heater of FIG. 1.

Referring now to FIG. 4, the bottom end cap assembly 14 includes an intermediate end cap 56 and a manifold cap 58 at least partially surrounding a portion of the intermediate end cap 56. The intermediate end cap 56 and the manifold cap 58 cooperate to define an annular fluid manifold 60 which conveys an operating fluid from the inner fluid pathway 28 to the outer fluid pathway 32. The intermediate end cap 56 and manifold cap 58 are preferably formed from a plastic material such as PVDF.

Figure 5:
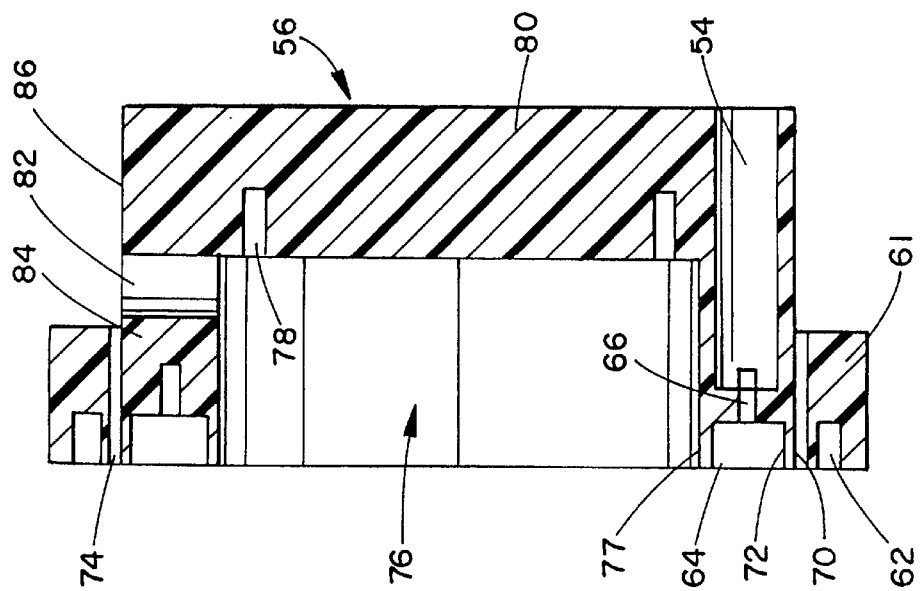
FIG. 5 is a longitudinal sectional view through a bottom intermediate end cap of the bottom end cap assembly of FIG. 4.
Figure 6:
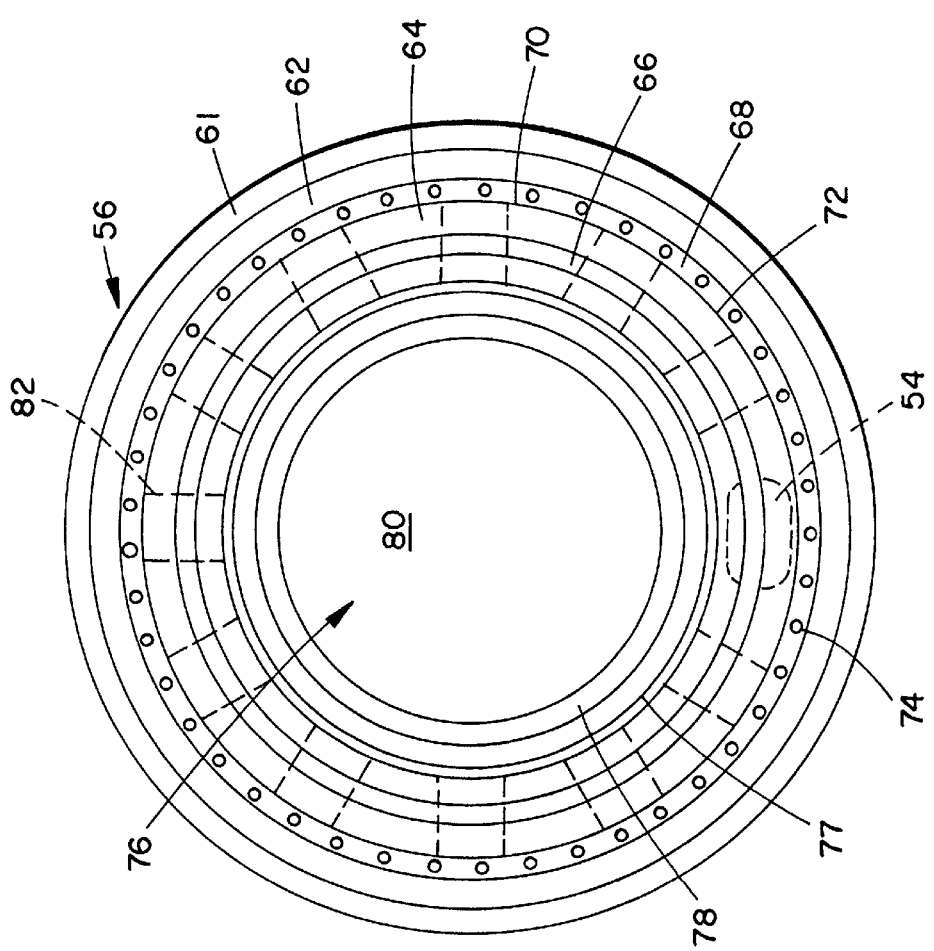
FIG. 6 is an end view of the bottom intermediate end cap shown in FIG. 5.

With continuing reference to FIG. 4 and particular reference to FIGS. 5 and 6, the intermediate end cap 56 includes an outer side wall portion 61 having a first annular groove 62 for receiving an end portion of the outer quartz tube 26 when the bottom end cap assembly 14 is secured to the intermediate body portion 10. A second annular groove 64 is spaced radially inward of the first annular groove 62 and receives mutual end portions of the inner heating element tube 20, heating element assembly 22 and outer heating element tube 24. An annular slot 66 extends axially from a closed end wall of the second annular groove 64 for receiving an end portion of the inner heating element tube 20 and the surrounding conductive ring 48 therein. A portion of the slot 66 communicates with the second power access port 54.

A common annular wall 68 defines a radially inner surface 70 of the first annular groove 62, and a radially outer surface 72 of the second annular groove 64. A plurality of circumferentially spaced-apart bores 74 extend axially through the common annular wall 68. The circumferential spacing of the bores 74 around the whole outer fluid pathway 32 permits an even annular fluid flow through the outer fluid pathway 32 thus preventing stagnant areas within the outer fluid pathway where sediment deposition may occur. A central circular recess 76 is spaced radially inwardly of the second annular groove 64 by an inner side wall portion 77. A third annular groove 78 is located in a closed end wall 80 of the central circular recess 76. The annular groove 78 receives an end portion of the inner tube 18 therein when the bottom end cap assembly 14 is secured to the intermediate body portion 10.

A plurality of circumferentially spaced-apart cross bores 82 extend radially outwardly through an intermediate side wall portion 84. The cross bores 82 permit the central circular recess 76 to communicate with a contoured exterior surface 86 of the intermediate end cap 56. In the embodiment being described, there are eleven (11) cross bores 82 spaced circumferentially apart. The circumferential spacing of the cross bores 82 around the whole inner fluid pathway 28 permits an even annular fluid flow through the inner fluid pathway 28 thus preventing stagnant areas within the inner fluid pathway where sediment deposition may occur.

The manifold cap 58 (FIG. 4) includes an annular arcuate surface 88 which cooperates with the contoured exterior surface 86 of the intermediate end cap 56 to define the fluid manifold 60 when the manifold cap 58 is joined to the intermediate end cap 56. It should be appreciated that the cross bores 82 extend radially between, and communicate with, the central recess 76 and the fluid manifold 60. The bores 74 extend axially between the outer fluid manifold 32 and the fluid manifold 60.

Figure 7:
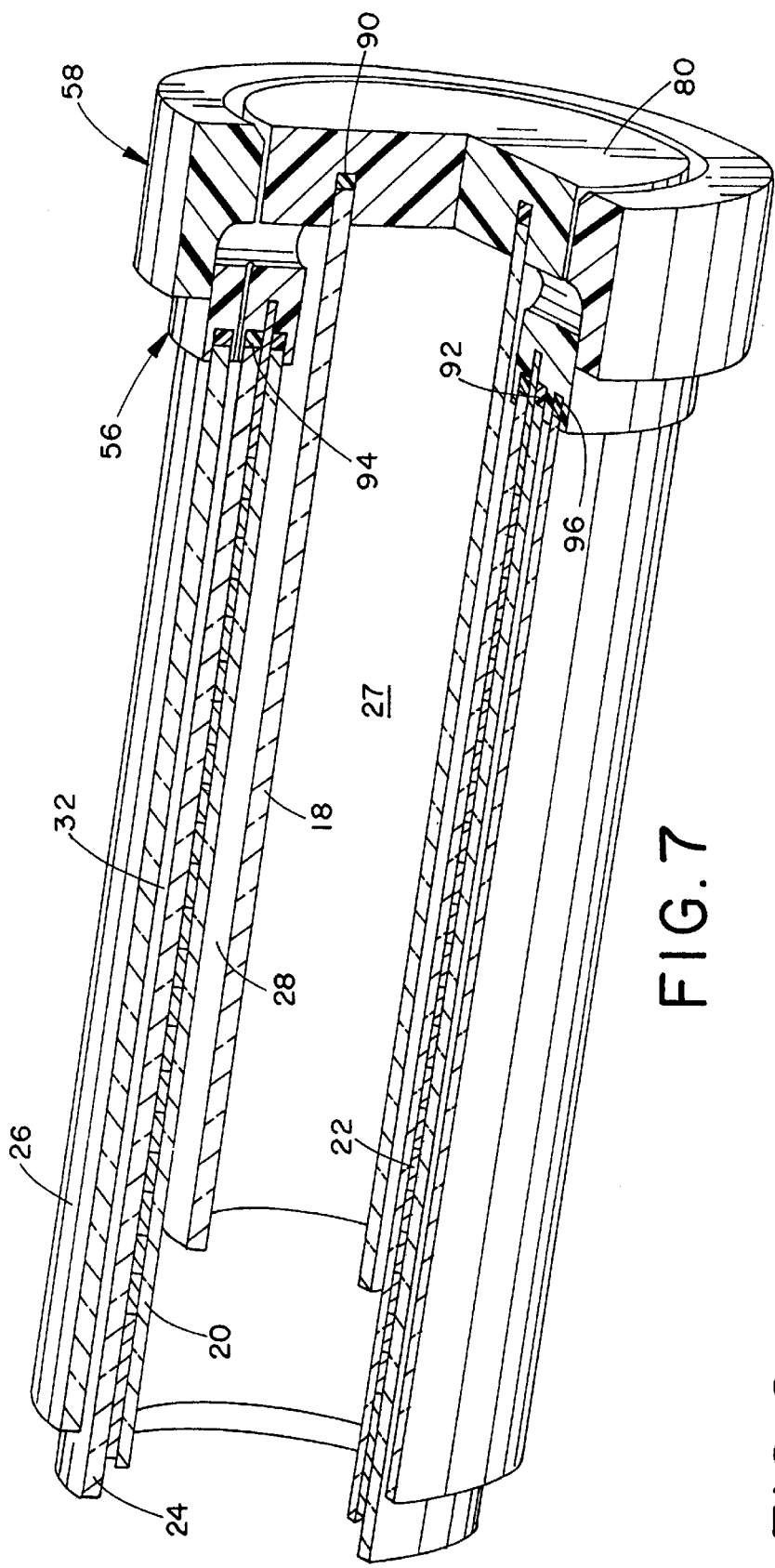
FIG. 7 is a perspective view, partially cut away, of the bottom end cap assembly of FIG. 4 secured to a central body portion of the fluid heater.
Figure 8:
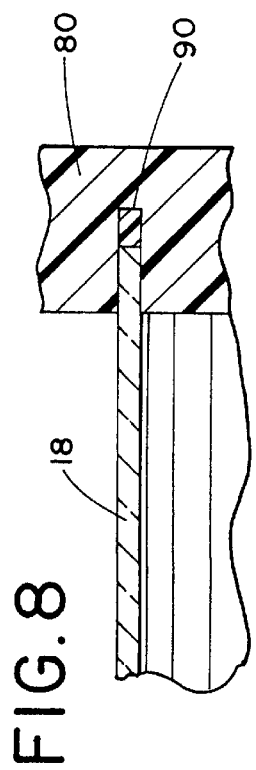
FIG. 8 is an enlarged sectional view of a gasket interposed between a quartz tube and a groove of the bottom intermediate end cap of FIG. 5.

Referring now to FIGS. 7 and 8, a first O-ring or gasket 90 is positioned within the groove 78. A second O-ring or gasket 92 and a third O-ring or gasket 94 are positioned within the groove 64, and a fourth O-ring or gasket 96 is positioned within the groove 62. The gaskets 90, 92, 94, 96 are seated within the respective grooves and resiliently abut the respective quartz tubes 18, 20, 24, 26 to form fluid-tight seals in the presence of an axial sealing force created when the top end cap assembly 16 is secured to the intermediate body portion 10 and bottom end cap assembly 14.

The gaskets 90–96 are preferably formed from a conventional fluroelastomeric material. It should be appreciated that the axial end seals formed between the quartz glass tubes and the plastic intermediate end cap 56 minimize the potential for fluid leaks by permitting differential thermal expansion of the quartz glass tubes and the plastic intermediate end cap 56 (i.e. the plastic end cap 56 has a coefficient of thermal expansion which is different from a coefficient of thermal expansion of the quartz tubes). The end seals are axially loaded by welding, or otherwise joining a stainless-steel flange 98 (FIG. 1) to the stainless steel shell 36.

As best seen in FIG. 8, the gaskets 90–96 are preferably rectangular in cross-section. The rectangular or square cross-section of the gaskets 90–96 specifically compensates for any inherent ovality of the quartz tubes. Such ovality of the quartz tubes facilitates fluid leaks when axially loading a conventional O-ring (having a circular cross-section). That is, if the axial loading of a conventional O-ring is off-center due to a slightly oval quartz tube, a side loading of the quartz tube develops which can cause the premature failure of the quartz tube. By using a gasket with a rectangular cross-section, the axial loading imparted by the quartz tubes is uniform across the entire sealing surface of the gasket regardless of any ovality of the tube.

Figure 9:
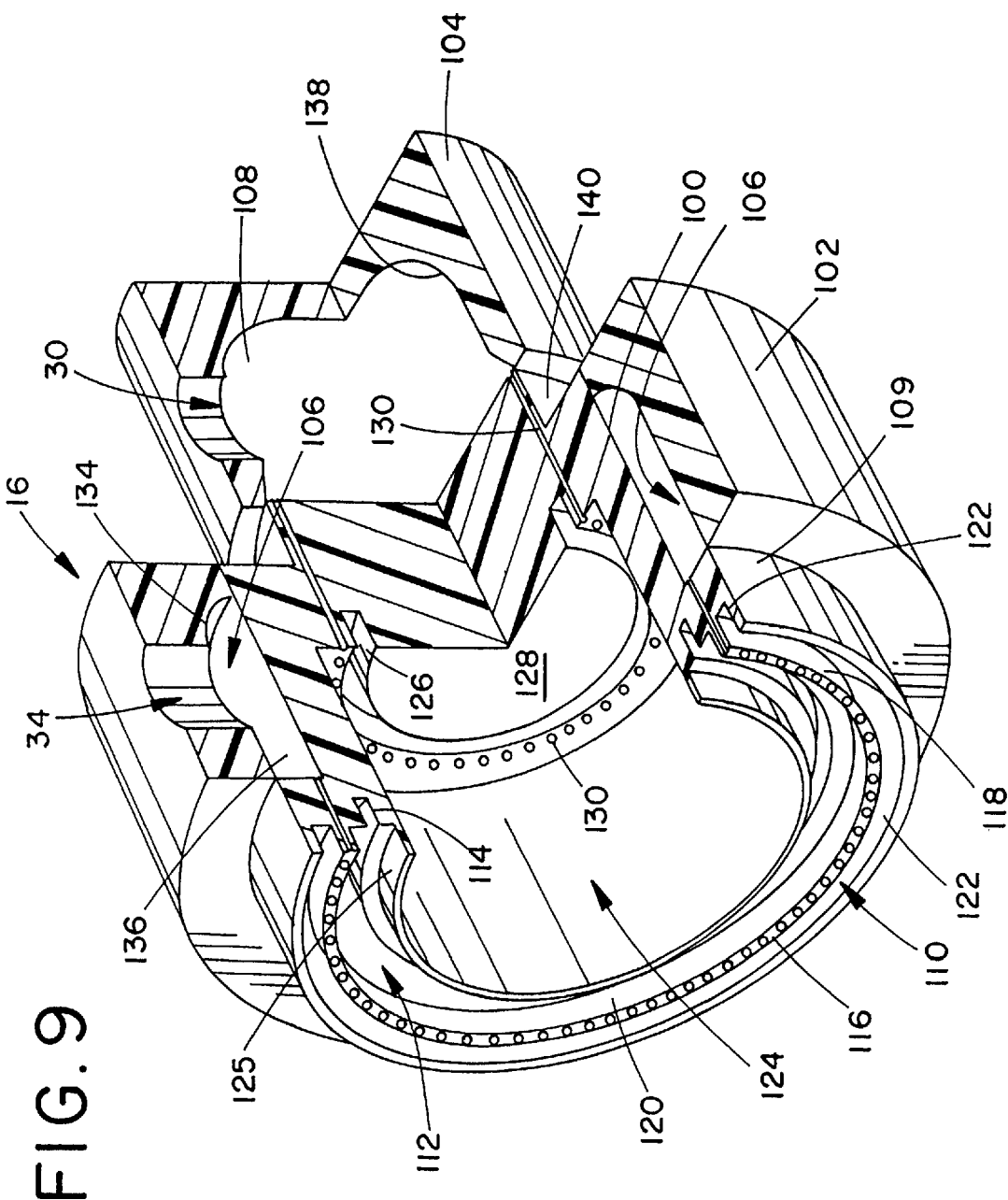
FIG. 9 is perspective view, partially cut away, of a top end cap assembly of the fluid heater of FIG. 1.

Referring now to FIG. 9, the top end cap assembly 16 includes an intermediate end cap 100, a manifold cap 102 at least partially surrounding a first portion of the intermediate end cap 100, and an inlet cap 104 at least partially surrounding a second portion of the intermediate end cap 100. The intermediate end cap 100 and the manifold cap 102 cooperate to define an annular outlet manifold 106 which conveys heated fluid from the outer fluid pathway 32 to the outlet port 34. The intermediate end cap 100 and the inlet cap 104 cooperate to define an inlet manifold 108 which conveys the fluid to be heated from the inlet port 30 to the inner fluid pathway 28. The intermediate end cap 100, manifold cap 102 and inlet cap 104 are preferably formed from a plastic material such as PVDF.

Figure 11:
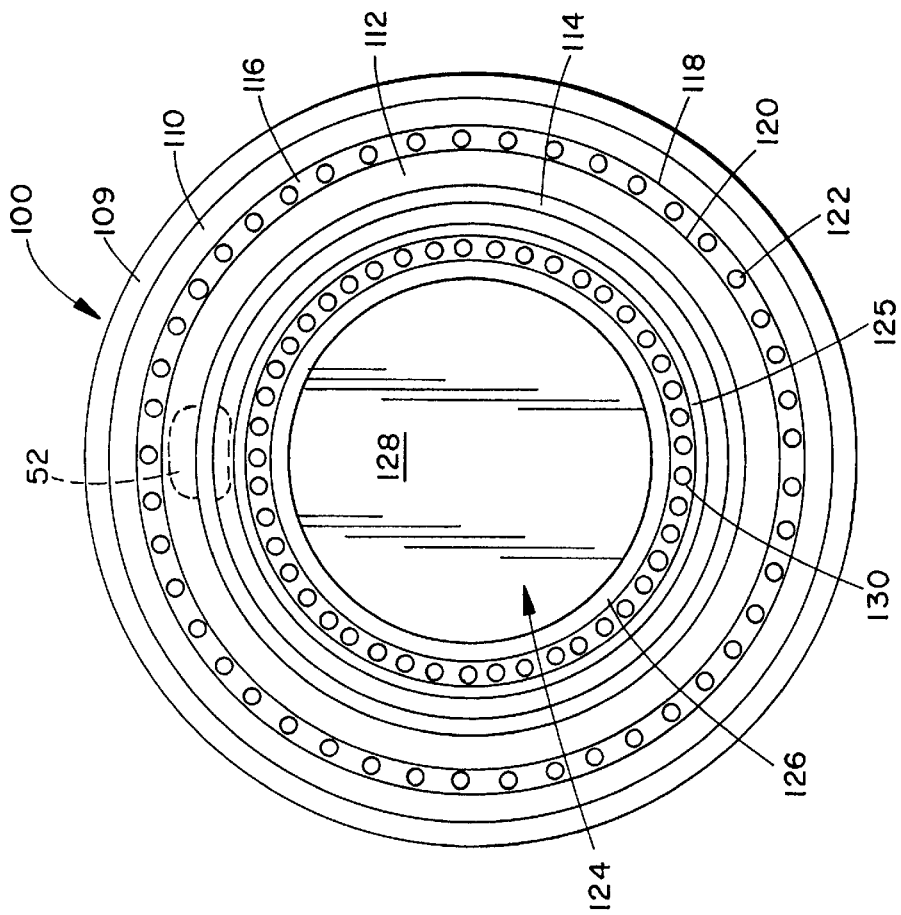
FIG. 11 is an end view of the top intermediate end cap of FIG. 10.
Figure 10:
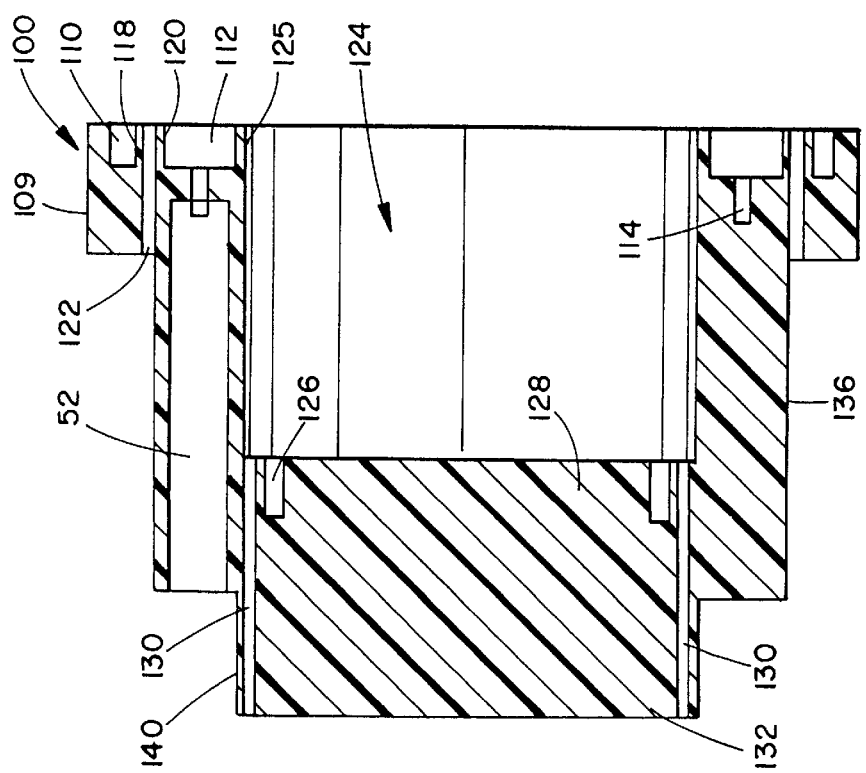
FIG. 10 is a longitudinal sectional view through a top intermediate end cap of the top end cap assembly of FIG. 9.

With continuing reference to FIG. 9 and particular reference to FIGS. 10 and 11, the intermediate end cap 100 includes an outer side wall portion 109 having a first annular groove 110 for receiving the other end portion of the outer quartz tube 26 when the top end cap assembly 16 is secured to the intermediate body portion 10. A second annular groove 112 is spaced radially inward of the first annular groove 110 and receives the other end portions of the inner heating element tube 20, heating element assembly 22 and outer heating element tube 24. An annular slot 114 extends axially from a closed end wall of the second annular groove 112 for receiving the other end portion of the inner heating element tube 20 and the other conductive ring 48 therein. A portion of the slot 114 communicates with the first power access port 52.

A common annular wall 116 defines a radially inner surface 118 of the first annular groove 110, and a radially outer surface 120 of the second annular groove 112. A plurality of circumferentially spaced-apart bores 122 extend axially through the common annular wall 116. The circumferential spacing of the bores 122 around the whole outer fluid pathway 32 permit an even annular fluid flow through the outer fluid pathway 32 thus preventing stagnant areas within the outer fluid pathway where sediment deposition may occur. A central circular recess 124 is spaced radially inwardly of the second annular groove 112 by an inner side wall portion 125. A third annular groove 126 is located in a closed end wall 128 of the central circular recess 124. The annular groove 126 receives the other end of the inner tube 18 when the top end cap assembly 16 is secured to the intermediate body portion 10.

A plurality of circumferentially spaced-apart bores 130 extend axially through the end wall 128. The bores 130 are spaced radially outward of the groove 126. The bores 130 permit the inner fluid pathway 28 to communicate with an outer end surface 132 of the intermediate end cap 100. The circumferential spacing of the bores 130 around the whole inner fluid pathway 28 permits an even annular fluid flow through the inner fluid pathway 28 thus preventing stagnant areas within the inner fluid pathway where sediment deposition may occur.

Referring again to FIG. 9, the manifold cap 102 includes an annular arcuate surface 134 which cooperates with an exterior side surface 136 of the intermediate end cap 100 to define the outlet manifold 106 when the manifold cap 102 is joined to the intermediate end cap 100. It should be appreciated that the bores 122 extend axially between the outer fluid pathway 32 and the outlet manifold 106.

The inlet cap 104 includes a cylindrical cavity 138 which defines the inlet manifold 108. The cavity 138 has a inner diameter at a free end thereof which is slightly greater than an outer diameter of a cylindrical exterior surface 140 of the intermediate end cap 100. The bores 130 permit the inner fluid pathway 28 to communicate with the inlet manifold 108 when the manifold cap 104 is joined to the intermediate end cap 100.

Figure 12:
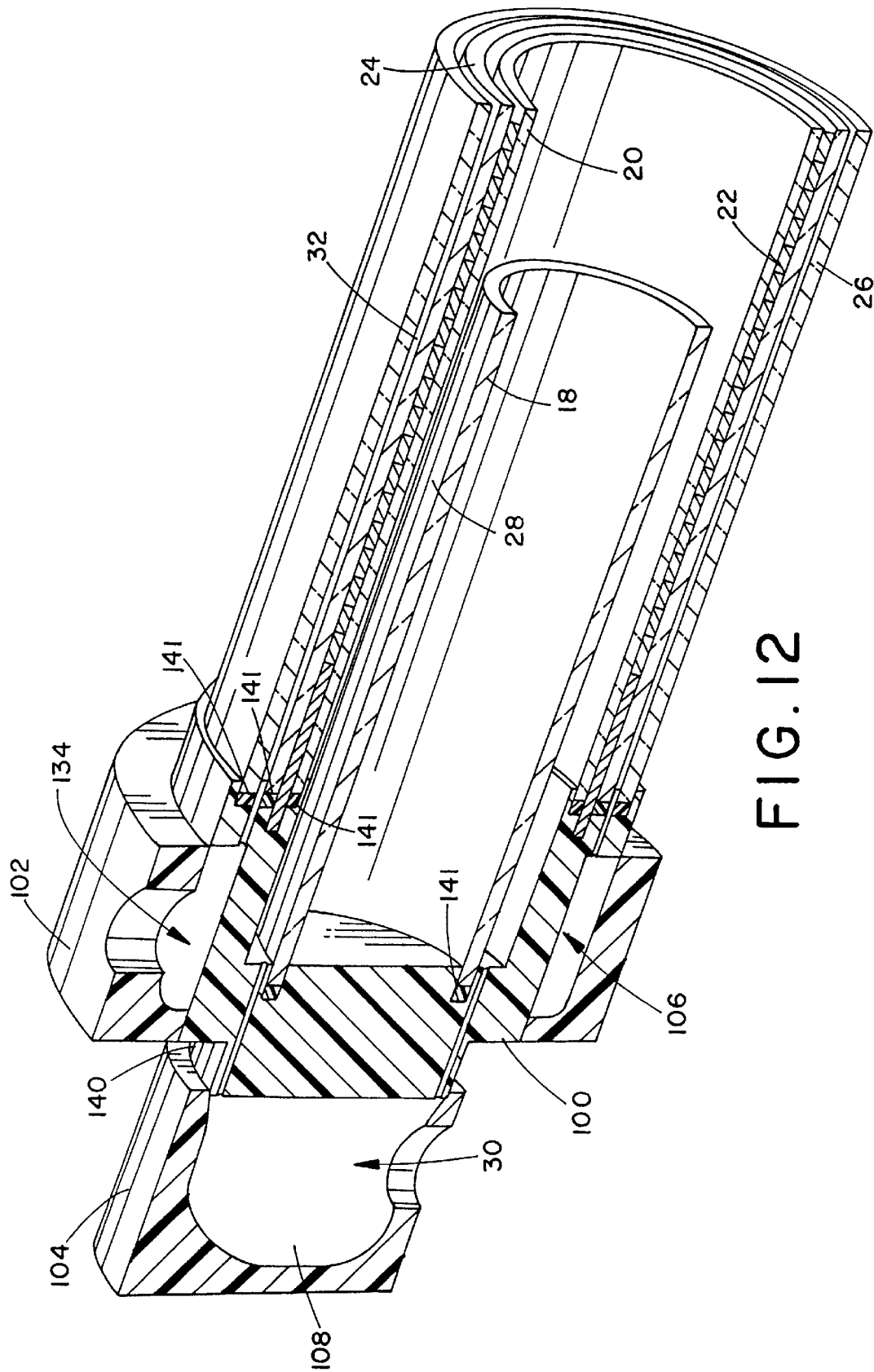
FIG. 12 is a perspective sectional view of the top end cap assembly of FIG. 9 secured to the central body portion of the fluid heater.

Referring now to FIG. 12, O-rings or gaskets 141 are seated in the grooves 110, 112 and 126 of the top end cap assembly 16. The gaskets 141 are identical to and serve the same purpose as the gaskets 90–96. That is, the gaskets 141 preferably have a rectangular cross section and resiliently abut the quartz tubes 18, 20, 24, 26 to form fluid-tight seals in the presence of an axial sealing force created when the top end cap assembly 16 is joined with the intermediate body portion 10.

Referring again to FIG. 1, a number of circumferentially spaced-apart weld flanges 142 are joined to the stainless steel outer shell 36 proximate the top end cap assembly 16. A retaining flange 144 has a central bore therethrough which surrounds the cylindrical exterior surface portion 140 (FIG. 12) of the intermediate end cap 100, surrounds at least a portion of the inlet cap 104, and abuts against an end surface of the manifold cap 102. A number of assembly bolts 148 join the retaining flange 144 to the weld flanges 142 so as to impart an axial compressive or sealing force on the top end cap assembly 16 and intermediate body portion 10 and bottom end cap assembly 14.

Figure 13:
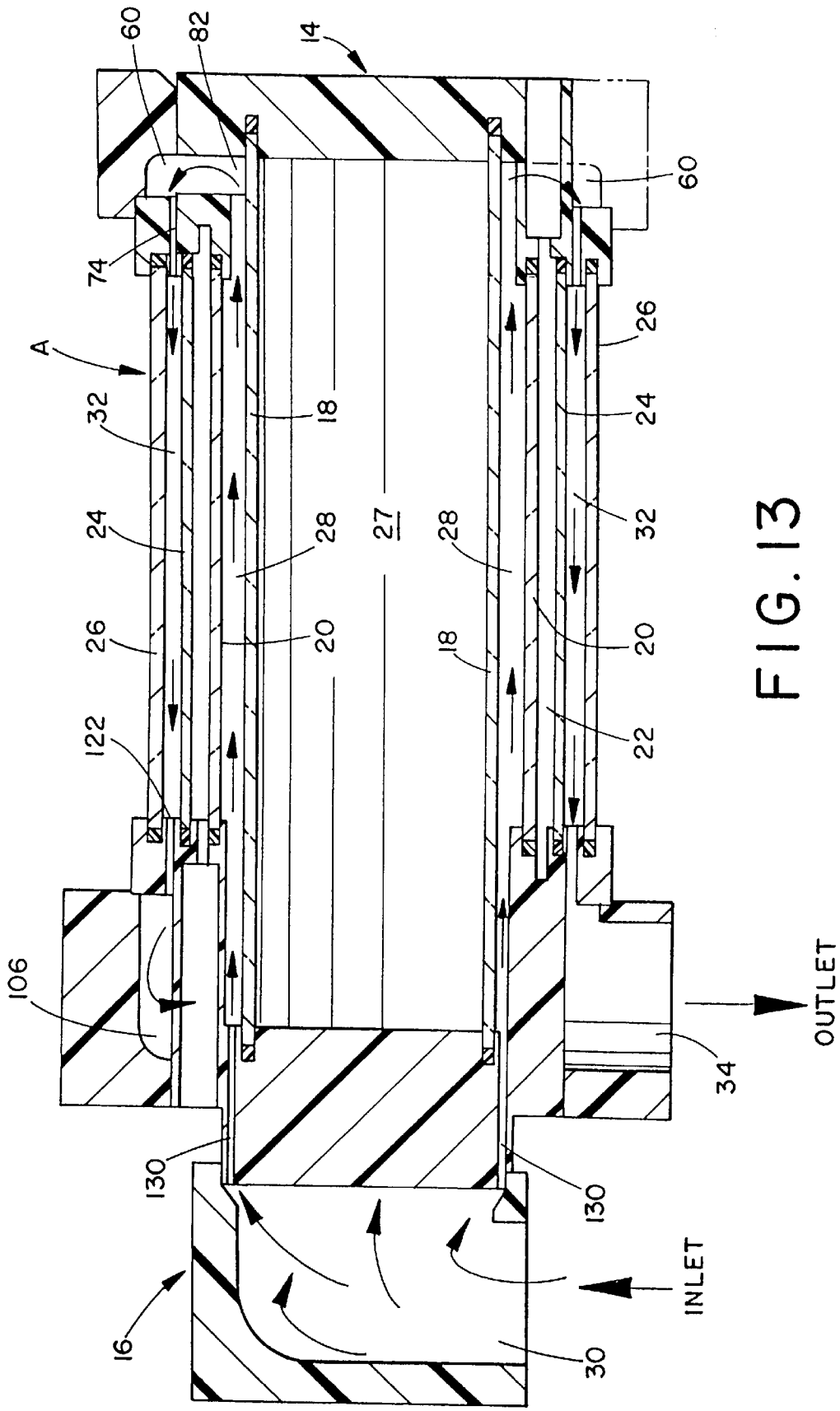
FIG. 13 is a longitudinal sectional view showing a fluid flow path through the fluid heater.

Referring now to FIG. 13, the operation of the fluid heater A will now be described. An operating fluid to be heated, such as UPDI water, enters the inlet port 30 via a standard PVDF plumbing connection (not shown). The UPDI water is distributed by the circular array of bores 130 into the inner annular fluid pathway 28.

The UPDI water is heated during the first pass over the inner heating element tube 20. In particular, the UPDI water is heated by the conduction of thermal energy from the heating element assembly 22 through the quartz inner heating element tube 20. The UPDI water is also heated by convection as the UPDI water flows along the quartz inner heating element tube 20 through the inner fluid pathway 28. The UPDI water is also heated by heat radiation from the resistive heating element 42 (FIG. 2). That is, the resistive heating element 42 operates at temperatures that produce radiant heat at a specific wavelength (e.g. $2.7\mu$) for maximum absorption by the UPDI water. This approach yields the lowest possible mass of the resistive heating element 42 while providing the most efficient heat source.

The heated UPDI water flows from the inner fluid pathway 28 through the cross bores 82 and into the fluid manifold 60. From the fluid manifold 60, the UPDI water flows through the circular array of bores 74 and into the outer fluid pathway 32. The UPDI water is heated further by means of (1) conduction of thermal energy from the heating element assembly 22 through the quartz outer heating element tube 24, (2) by convection as the UPDI water flows along the quartz outer heating element tube 24 through the outer fluid pathway 32, and (3) by heat radiation from the resistive heating element 42.

It should be appreciated that the distribution of the UPDI water in the manner described above keeps fluid flow in the laminar region so as not to accelerate the erosion of the quartz tubes, thereby keeping particle generation to a minimum. It also equalizes fluid flow over the entire heated quartz surface, and maximizes heat transfer by yielding the highest log mean temperature difference (LMTD) possible. The heated UPDI water flows from the outer fluid pathway 32 through the circular array of bores 122 to the fluid manifold 106. The heated UPDI water exits the fluid heater A from the outlet port 34.

In the bottom end cap assembly 14 (FIG. 4), the grooves 62, 64 and 78 retain the gaskets 90–96 and center the quartz tubes 18, 20, 24 and 26. The grooves incorporate sufficient tolerances to center the quartz tubes and to compensate for the thermal expansion of the intermediate end cap 56 relative to the quartz tubes. However, if one or more of the quartz tubes 18, 20, 24 and 26 is slightly oval, or not perfectly centered in the intermediate end cap, the thermal expansion of the intermediate end cap 56 could cause one or more of the quartz tubes to fail.

Figure 14:
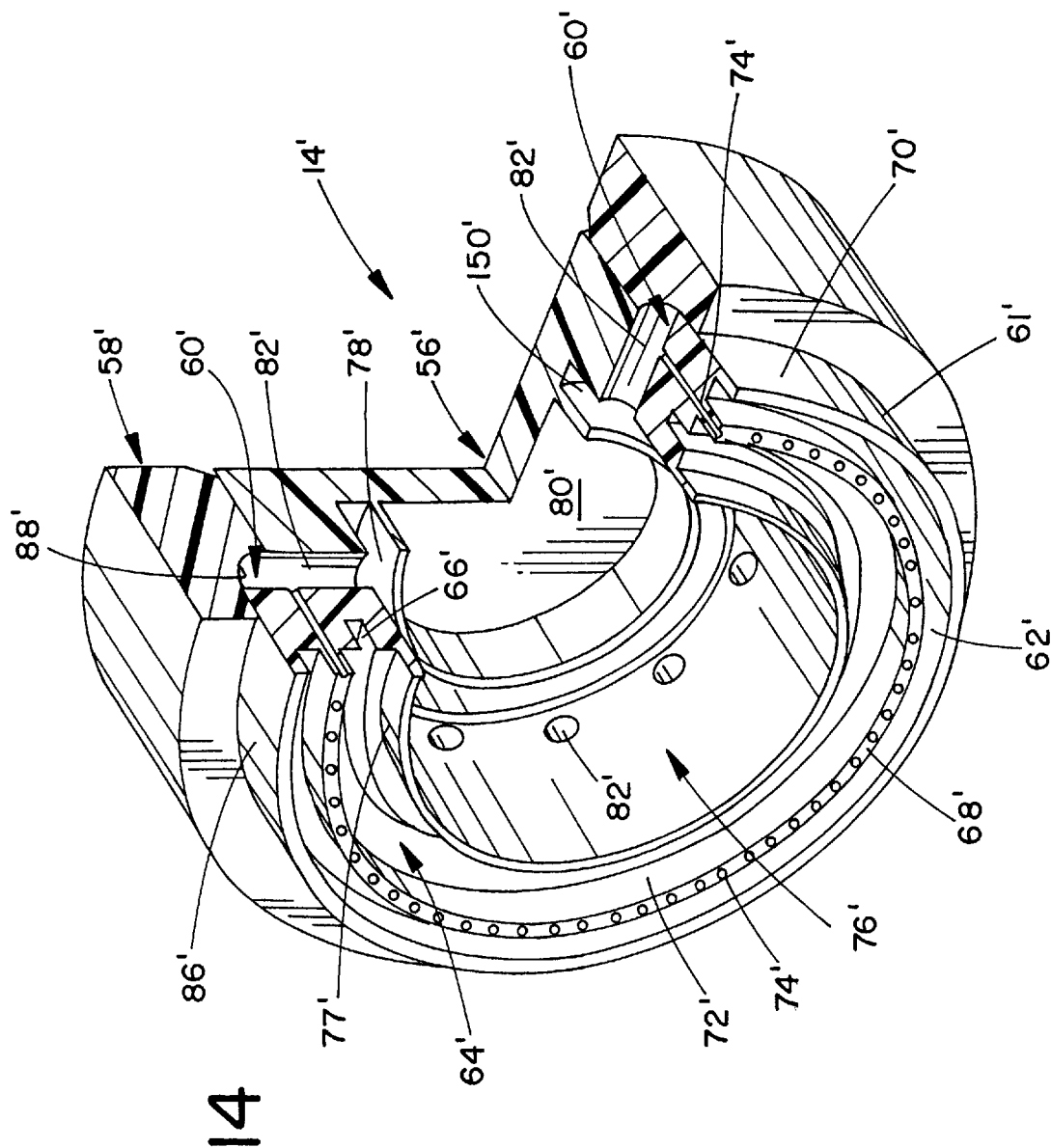
FIG. 14 is a perspective view, partially cut away, of a second embodiment of a bottom end cap assembly for the fluid heater of FIG. 1.

Referring now to FIG. 14, there is shown an alternative bottom end cap assembly 14'. The end-cap assembly 14' minimizes, or otherwise compensates for the effects of differential thermal expansion between the intermediate end cap 56' and the quartz tubes 16, 18, 22 and 26 by permitting the intermediate end cap 56' to radially expand without affecting or otherwise damaging the quartz tubes. In particular, the thickness of each of the side wall portions 61' and 77' partially defining the grooves 62' and 64' are reduced to the extent that the side wall portions 61' and 77' buckle or deform during thermal expansion without imparting excessive force on the quartz tubes.

In addition, the thickness of the common annular wall 68' is increased and the circumferential spacing between adjacent bores 74' is decreased. As a result, the material defining the common annular wall between adjacent bores compresses and/or deforms during thermal expansion of the intermediate end cap 56' thereby reducing stress on the quartz tubes. Thus, the bores 74' are circumferentially spaced-apart in closer proximity to one another to reduce the amount of plastic material in the wall portions between adjacent bores 74'. By reducing the amount of material, the wall portions can more easily flex to accommodate the differential thermal expansion between the intermediate end cap 56' and the quartz tubes.

Further, the groove 78' is defined by a side wall 150' having a radial thickness which permits the side wall 150' to buckle or deform as a result of thermal expansion of the intermediate end cap 56' without imparting excessive force on the quartz tube 18. In contrast, the groove 78 (FIG. 4) is located in the closed end wall 80 of the central circular recess 76, which closed end wall 80 can not readily buckle or deform.

Likewise, in the top end cap assembly 16 (FIG. 9), the grooves 110, 112 and 126 retain the gaskets 90–96 and center the quartz tubes 18, 20, 24 and 26. The grooves incorporate sufficient tolerances to center the quartz tubes and to compensate for the thermal expansion of the intermediate end cap 100 relative to the quartz tubes. However, if one or more of the quartz tubes 18, 20, 24 and 26 is slightly oval, or not perfectly centered in the intermediate end cap, the thermal expansion of the intermediate end cap 100 could cause one or more of the quartz tubes to fail.

Figure 15:
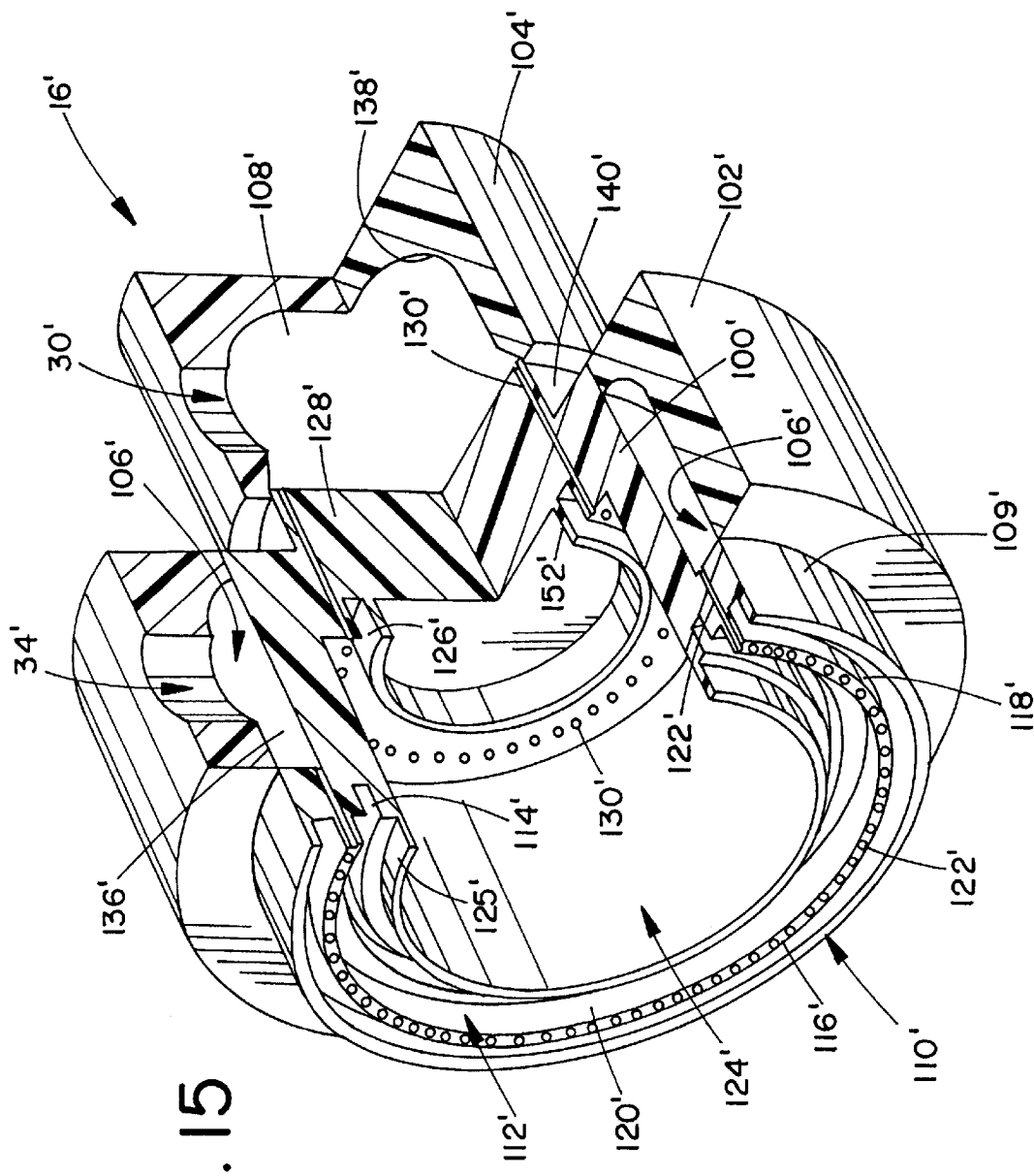
FIG. 15 is perspective view, partially cut away, of a second embodiment of a top end cap assembly for the fluid heater of FIG. 1.

Referring now to FIG. 15, there is shown an alternative top end cap assembly 16'. The end-cap assembly 16' minimizes, or otherwise compensates for the effects of differential thermal expansion between the intermediate end cap 100' and the quartz tubes 18, 20, 24 and 26 (i.e. the plastic top end cap assembly has a coefficient of thermal expansion which is different from a coefficient of thermal expansion of the quartz tubes) by permitting the intermediate end cap 100' to radially expand without affecting or otherwise damaging the quartz tubes. In particular, the thickness of each of the side wall portions 109' and 125' partially defining the grooves 110' and 112' are reduced to the extent that the side wall portions 109' and 125' buckle or deform as a result of thermal expansion without imparting excessive force on the quartz tubes.

In addition, the thickness of the common annular wall 114' is increased and the circumferential spacing between adjacent bores 122' is decreased. As a result, the material defining the common annular wall between adjacent bores compresses and/or deforms during thermal expansion of the intermediate end cap 100' thereby reducing stress on the quartz tubes. Thus, the bores 122' are circumferentially spaced-apart in closer proximity to one another to reduce the amount of plastic material in the wall portions between adjacent bores 122'. By reducing the amount of material, the wall portions can more easily flex to accommodate the differential thermal expansion between the intermediate end cap 100' and the quartz tubes.

Further, the groove 126' is defined by a side wall 152' having a radial thickness which permits the side wall 152' to buckle or deform during expansion without imparting excessive force on the quartz tube 18. In contrast, the groove 126 (FIG. 9) is located in the closed end wall 128 of the central circular recess 124, which closed end wall 128 cannot readily buckle or deform.

As previously mentioned, a fluid heater A having a total operating fluid holding capacity of approximately ten (10) fluid ounces holds about 4.5 fluid ounces in inner fluid pathway 28 and about 5.5 fluid ounces in the outer fluid pathway 32. In an off-state of the fluid heater A, a temperature overshoot of the operating fluid can occur due to the relatively small mass of liquid remaining within the fluid pathways. That is, to the extent that the resistive heating element 42 has hysteresis, the fluid remaining within the fluid pathways continues to be heated after the fluid heater has been cycled to an off-state. A subsequent on-state of the fluid heater A may then cause over-heated fluid to be discharged from the fluid heater.

Figure 16:
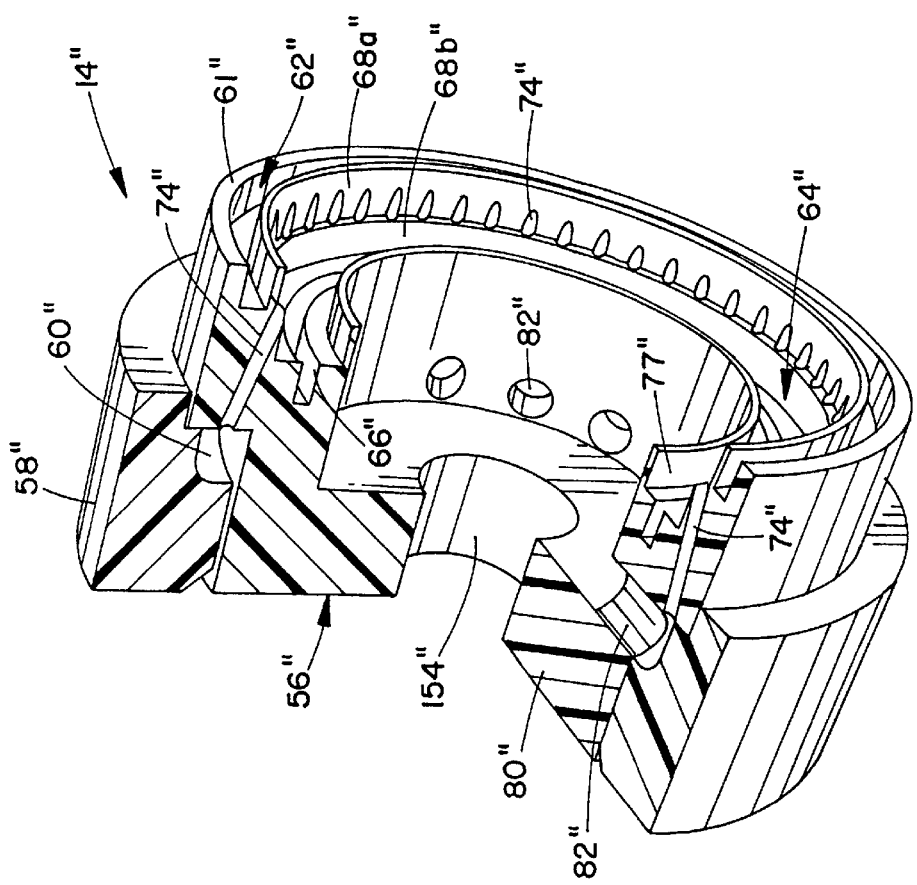
FIG. 16 is a perspective view, partially cut away, of a third embodiment of a bottom end cap assembly for the fluid heater of FIG. 1.

Referring now to FIG. 16, there is shown an alternate bottom end cap assembly 14" which enhances temperature stabilization by minimizing or otherwise compensating for temperature overshoots of operating fluid caused by repeatedly cycling a fluid heater on and off. As described further below, the bottom end cap assembly 14" is used in conjunction with a fluid heater having the inner quartz tube 18 (FIG. 7) removed. With the inner quartz tube 18 removed, the volume of the inner fluid pathway 28 is increased and the additional amount of operating fluid therein acts as a heat sink during off-states of the fluid heater. It should be appreciated that temperature stabilization is enhanced while the high efficiencies obtained with the outer fluid pathway 32 are maintained to the same extent as previously described.

Figure 17:
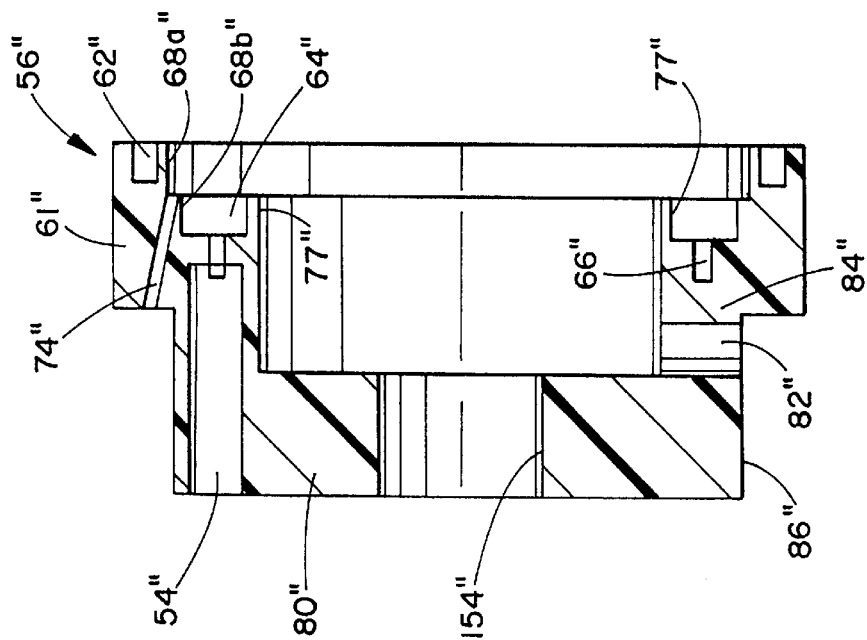
FIG. 17 is a longitudinal sectional view through a bottom intermediate end cap of the bottom end cap assembly of FIG. 16.

With continuing reference to FIG. 16, and particular reference to FIG. 17, the bottom end cap assembly 14" includes an intermediate end cap 56" and a manifold cap 58" at least partially surrounding a portion of the intermediate end cap 56". The intermediate end cap 56" and the manifold cap 58" cooperate to define an annular fluid manifold 60" which conveys operating fluid from an inner fluid pathway or cavity 28 to an outer annular fluid pathway 32. The end cap 56" includes an outer side wall portion 61" having a first annular groove 62" for receiving an end portion of the outer quartz tube 26. A second annular groove 64" is spaced radially inward of the first annular groove 62" and receives mutual end portions of the inner heating element tube 20, heating element assembly 22 and outer heating element tube 24. An annular slot 66" extends axially from an end wall of the second annular groove 64".

An annular stepped wall 68" separates the groove 62" from the groove 64". A radially outer portion 68a" defines a radially inner wall of the groove 62". A radially inner portion 68b" defines a radially outer wall of the groove 64". A plurality of circumferentially spaced-apart bores 74" extend from the interface between the wall portions 68a", 68b" and communicate with the annular fluid manifold 60". A central circular recess 76" is spaced radially inwardly of the second annular groove 64" by an inner side wall portion 77". A plurality of circumferentially spaced-apart cross bores 82" extend radially outwardly through an intermediate side wall portion 84". The cross bores 82" permit the central circular recess 76" to communicate with a contoured exterior surface 86". An aperture 154" extends through an end wall 80" of the recess 76". When the fluid heater is operating, a drain plug (not shown) is inserted in the aperture 154" to prevent fluid flow through the aperture 154".

As with the end-cap assembly 14', the end cap assembly 14" minimizes, or otherwise compensates for the effects of differential thermal expansion between the intermediate end cap 56" and the quartz tubes 20, 24 and 26 by permitting the intermediate end cap 56" to radially expand without affecting or otherwise damaging the quartz tubes. In particular, the radial thickness of at least the side wall portions 68a" and 77" is reduced to the extent that the side wall portions 68a" and 77" buckle or deform during thermal expansion of the intermediate end cap 56" without imparting excessive force on the quartz tubes.

Referring now to FIG. 18, there is shown a top end cap assembly 16" which is used in conjunction with the bottom end cap assembly 14" of FIGS. 16 and 17 to increase the volume of an inner fluid pathway or cavity. The top end cap assembly 16" includes an intermediate end cap 100", a manifold cap 102" at least partially surrounding a first portion of the intermediate end cap 100", and an inlet cap 104" at least partially surrounding a second portion of the intermediate end cap 100". The intermediate end cap 100" and the manifold cap 102" cooperate to define an annular outlet manifold 106" which conveys heated fluid from an outer fluid pathway to an outlet port 34". The intermediate end cap 100" and the inlet cap 104" cooperate to define an inlet manifold 108" which conveys the fluid to be heated from the inlet port 30" to a central fluid cavity 156".

With continuing reference to FIG. 18, and particular reference to FIG. 19, the intermediate end cap 100" includes an outer side wall portion 109" having a first annular groove 110" for receiving the tube 26. A second annular groove 112" is spaced radially inward of the first annular groove 110" and receives the inner heating element tube 20, heating element assembly 22 and outer heating element tube 24. An annular slot 114" extends axially from an end wall of the groove 112".

An annular stepped wall 116" separates the groove 110" from the groove 112". A radially outer portion 116a" defines a radially inner wall of the groove 110". A radially inner portion 116b" defines a radially outer wall of the groove 112". A plurality of circumferentially spaced-apart bores 122" extend from an interface between the wall portions 116a", 116b" to communicate with the outlet manifold 106". A central circular recess 124" is spaced radially inward of the second annular groove 112" by an inner side wall portion 125". An aperture 158" extends through an end wall 128" of the recess 124" to permit the an inlet manifold 108" of the inlet cap 104" to communicate with the inner fluid cavity 156"

As with the end-cap assembly 16', the end cap assembly 16" minimizes, or otherwise compensates for the effects of differential thermal expansion between the intermediate end cap 100" and the quartz tubes 20, 24 and 26 by permitting the intermediate end cap 100" to radially expand without affecting or otherwise damaging the quartz tubes. In particular, the radial thickness of at least the side wall portions 116a" and 125" is reduced to the extent that the side wall portions 116a" and 125" buckle or deform during thermal expansion of the intermediate end cap 100" without imparting excessive force on the quartz tubes.

Figure 20:
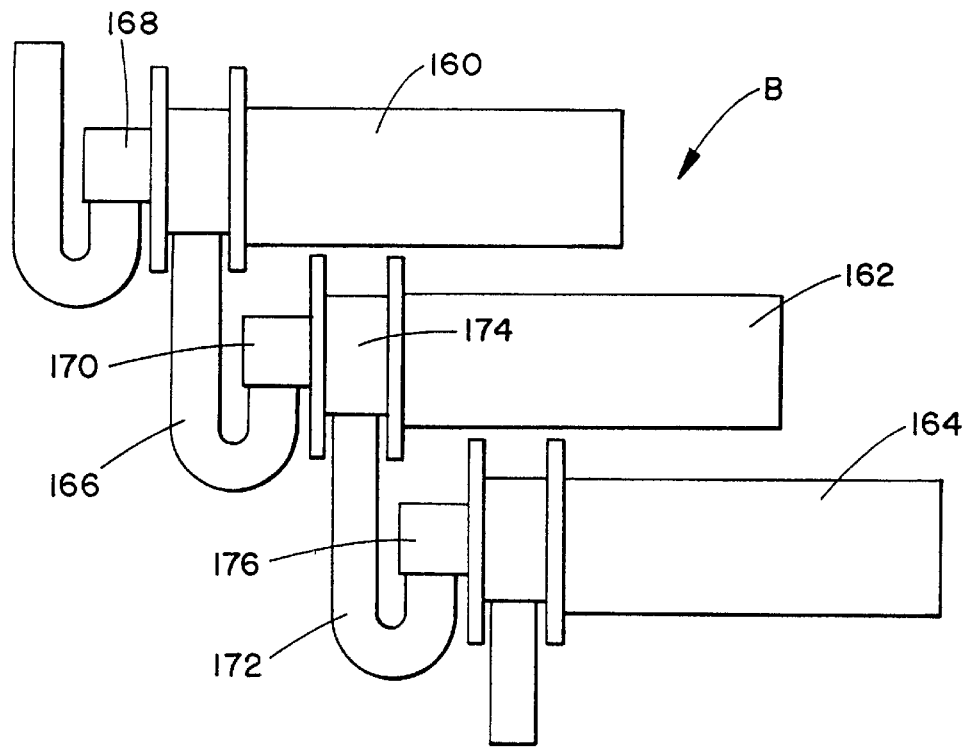
FIG. 20 is a diagrammatic view of a multi-stage fluid heater which incorporates the features of the present invention therein.

Referring now to FIG. 20, there is shown a multi-stage fluid heater B comprising a first heating chamber 160, connected in series to a second heating chamber 162, connected in series to a third heating chamber 164. A first fluid duct 166 connects an output port 168 of the first heating chamber 160 to an input port 170 of the second heating chamber 162. A second fluid duct 172 connects an output port 174 of the second heating chamber 162 to an input port 176 of the third heating chamber 164. It should be appreciated that the first, second and third heating chambers 160–164 are each comparable in construction to the fluid heater A (FIGS. 1–19) discussed above.

Figure 21:
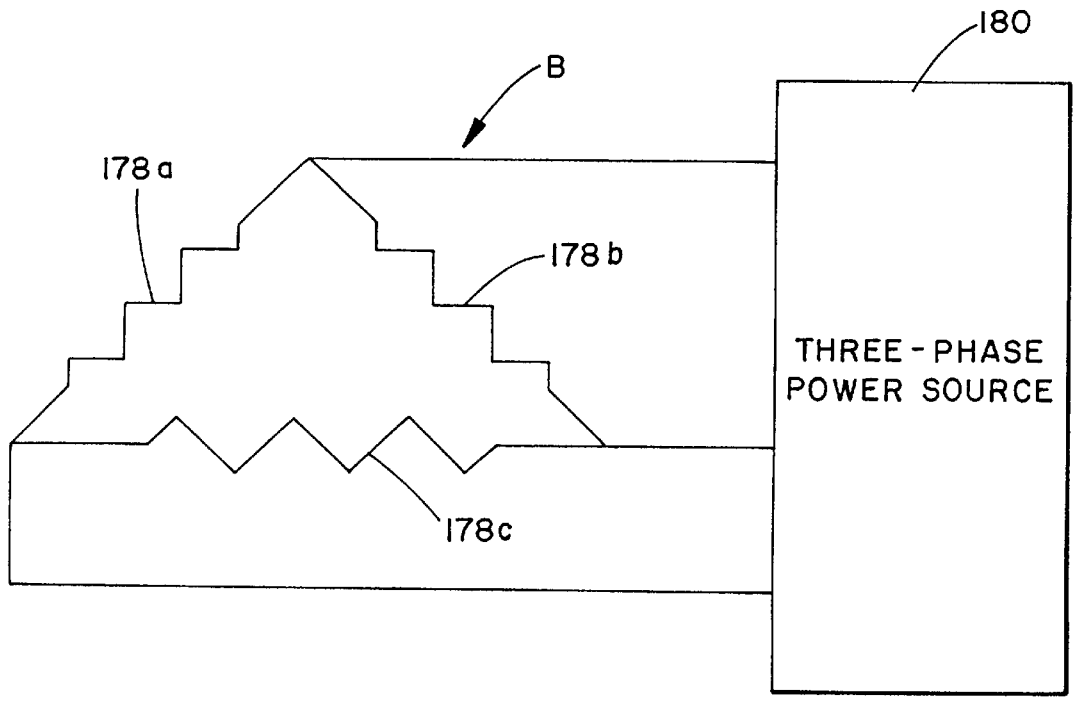
FIG. 21 is a schematic diagram of a three phase power source connection to resistive heating elements of the fluid heater of FIG. 20.

As shown in FIG. 21, the fluid heater B has three Nichrome heating elements 178a–178c which have a combined power rating of approximately 52.5 kilowatts. The fluid heater B has a total operating fluid holding capacity of approximately 44 fluid ounces. When combined, the inner fluid pathways hold approximately 20 fluid ounces and the outer fluid pathways hold approximately 24 fluid ounces.

As with the fluid heater A, the velocity of the fluid flow through the inner and outer fluid pathways of the fluid heater B may vary depending upon the desired temperature increase of the operating fluid. For instance, at flow rate of about 2.8 GPM, the operating fluid has a velocity of approximately 1.8 feet/second and takes approximately ten seconds to flow through the fluid heater B. An operating fluid flowing through the fluid heater B at a rate of 2.8 GPM experiences a temperature increase from a nominal input temperature of 68° F. (20° C.) to approximately 194° F. (90° C.) output temperature.

If the flow rate of the operating fluid is increased to 8.0 GPM, the operating fluid has a velocity of approximately 5.1 feet/second and takes approximately 2.6 seconds to flow through the fluid heater B. An operating fluid flowing through the fluid heater at 8.0 GPM experiences a 45° F. temperature increase from a nominal input temperature of 68° F. (20° C.) to approximately 113° F. (45° C.) output temperature.

It is desirable to maintain the fluid velocity through the fluid heater B at a relatively low velocity, e.g. under 6.0 ft/s, in order to prevent or reduce erosion of the quartz-lined inner and outer fluid pathways. It should be appreciated that the velocity of fluid flow through the fluid heater B not only insures that the heat generated by the heating elements 178a–178c is carried away, but also assists in preventing stagnant fluid flow areas within the inner and outer fluid pathways where sediment deposition could occur.

The fluid heater B may be connected to a source of three-phase input power 180 by connecting the three resistive heating elements 178a–178c together in a known delta configuration wherein each heating element 178a–178c is connected across one phase of the three-phase power source 180.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A fluid heater comprising:
    an intermediate body portion having a first fluid pathway and a second fluid pathway, said second fluid pathway surrounding said first fluid pathway;
    a bottom end cap assembly secured to said intermediate body portion and communicating with said first and said second fluid pathways, said bottom end cap assembly including a plurality of cross bores for permitting an operating fluid to transfer between said first and said second fluid pathways;
    a top end cap assembly secured to said intermediate body portion and having an inlet port and an outlet port each communicating with one of said first and said second fluid pathways; and
    said bottom end cap assembly and said top end cap assembly being formed from a first material, and said first fluid pathway and said second fluid pathway being formed from a second material different from said first material.

2. The fluid heater of claim 1, wherein said intermediate body portion includes:
    a first tube defining said first fluid pathway therein,
    a second tube surrounding said first tube,
    a third tube surrounding said second tube, said second fluid pathway being defined between said second and said third tubes, and a heating element interposed between said first and said second tubes.

3. The fluid heater of claim 2, wherein said first, second and third tubes are formed from quartz material and said bottom and top end cap assemblies are formed from a plastic material.

4. The fluid heater of claim 2, wherein said first, second and third tubes are concentric.

5. The fluid heater of claim 2, wherein said heating element includes a resistive wire encased in an insulating sleeve, said heating element being wrapped around a radially outer surface of said first tube.

6. The fluid heater of claim 5, wherein said resistive wire is formed from Nichrome and said insulating sleeve is formed from a fibrous quartz braid.

7. The fluid heater of claim 2, further including a fourth tube positioned within said first tube, said first fluid pathway being defined between said first and said fourth tubes.

8. The fluid heater of claim 2, wherein each of said bottom and said top end cap assembly includes:
   a plurality of grooves for receiving said first, second and third tubes therein, and
   a gasket positioned in each of said grooves.

9. The fluid heater of claim 8, wherein said gaskets each has a rectangular cross section.

10. The fluid heater of claim 8, wherein at least one of said grooves is defined by a side wall portion which deforms or flexes in response to thermal expansion of said end cap assembly.

11. The fluid heater of claim 1, wherein said first and said second fluid pathways are formed by a plurality of quartz tubes and said bottom and top end cap assemblies are formed from a plastic material.

12. The fluid heater of claim 1, wherein said bottom end cap assembly further includes:
   an intermediate end cap, and
   a manifold cap partially surrounding said intermediate end cap to define an annular fluid manifold, said cross bores extending between said first fluid pathway and said annular fluid manifold.

13. The fluid heater of claim 1, wherein said top end cap assembly further includes:
   an intermediate end cap,
   a manifold cap partially surrounding a first portion of said intermediate end cap to define an outlet manifold which communicates with said outlet port, and
   an inlet cap partially surrounding a second portion of said intermediate end cap to define an inlet manifold which communicates with said inlet port.

14. The fluid heater of claim 1, further including a plurality of fluid-tight seals interposed between said intermediate body portion and each of said bottom and said top end cap assemblies, said fluid-tight seals permitting differential thermal expansion between said intermediate body portion and said bottom and said top end cap assemblies.

15. The fluid heater of claim 14, further including a metal shell surrounding said intermediate body portion and joined to said bottom and top end cap assemblies to axially load said fluid-tight seals and to provide a safety path to ground potential in the event of a failure of the fluid heater.

* * * * *